(12) United States Patent
Lin et al.

(10) Patent No.: US 8,013,048 B2
(45) Date of Patent: Sep. 6, 2011

(54) POLYMERIC POLYAMINES AND METHOD FOR STABILIZING SILVER NANOPARTICLE BY EMPLOYING THE SAME

(75) Inventors: Jiang-Jen Lin, Taipei (TW); Wei-Cheng Tsai, Taipei (TW); Yen-Chi Hsu, Taipei (TW); Wen-Hsin Chang, Taipei (TW)

(73) Assignee: National Taiwan University, Taipei (TW)

( * ) Notice: Subject to any disclaimer, the term of this patent is extended or adjusted under 35 U.S.C. 154(b) by 635 days.

(21) Appl. No.: 12/140,507

(22) Filed: Jun. 17, 2008

(65) Prior Publication Data

US 2009/0149583 A1    Jun. 11, 2009

(30) Foreign Application Priority Data

Dec. 7, 2007  (TW) ............................... 96146929 A

(51) Int. Cl.
*C08K 3/08*       (2006.01)
*C08K 5/3415*  (2006.01)
*C08K 5/20*     (2006.01)
*C08K 5/107*   (2006.01)
*C08K 5/05*     (2006.01)
*C08F 26/00*   (2006.01)

(52) U.S. Cl. ........ 524/440; 524/104; 524/403; 524/233; 524/361; 524/386; 524/379; 526/312; 528/392; 528/363; 528/393

(58) Field of Classification Search .................. 524/440, 524/403, 104, 233, 361, 386, 379; 526/312; 528/392, 363, 393
See application file for complete search history.

(56) References Cited

U.S. PATENT DOCUMENTS

2006/0034899 A1\* 2/2006 Ylitalo et al. ................. 424/448
2007/0202074 A1\* 8/2007 Shalaby ..................... 424/78.27

\* cited by examiner

*Primary Examiner* — Kelechi Egwim
(74) *Attorney, Agent, or Firm* — Pai Patent & Trademark Law Firm; Chao-Chang David Pai

(57) ABSTRACT

The present invention discloses a polymeric polyamine which can be produced by polymerizing polyoxyalkylene-amine and a linker. The linker can be anhydride, carboxylic acid, epoxy, isocyanate or poly(styrene-co-maleic anhydride) copolymers (SMA). The present invention also discloses a method for stabilizing the Ag nanoparticles with polymeric polyamine. The polymeric polyamine serving as a stabilizer or dispersant is mixed with a water solution of silver salt and then a reducer is provided to reduce the silver ions and form an organic or a water solution of Ag nanoparticles. Water or solvent of this solution can be further removed through a heating, freezing or decompression process, and thus solid content of the solution can be increased. The concentrated solution also can be diluted to obtain a stable dispersion without aggregation.

14 Claims, 2 Drawing Sheets

POLYMERIC POLYAMINES AND METHOD FOR STABILIZING SILVER NANOPARTICLE BY EMPLOYING THE SAME

BACKGROUND OF THE INVENTION

1. Field of the Invention

The present invention relates to polymeric polyamines and a method for stabilizing Ag nanoparticles by employing the same. The produced Ag nanoparticles are in the form of silver slurry, silver gel or solid, and suitable for composite material or antimicrobial material. Fields of the present invention include electric industries, for example, conductive silver nanowires, parts and sensors, and biomedicine or medicinal industries. In addition, the Ag nanoparticles have both hydrophilic and hydrophobic properties and therefore can be dissolved in water and organic solvents, and are compatible with many kinds of polymers. Therefore, the product of the present invention is a good polymeric surfactant or dispersant suitable for dispersing nanoscale particles, for example, pigments and silver particles.

2. Related Prior Arts

The application of Ag nanoparticles is one of the most important technologies in this century. The traditional methods for producing water solutions of Ag nanoparticles are primarily to reduce silver nitrate or other silver salts with organic surfactants, dispersants or stabilizers for stabilizing the Ag nanoparticles. To exhibit good effects in antimicrobial, pharmaceutical, biomedicine and electrical applications, the Ag particles have to keep in the nanoscale and large surface areas without aggregation. Therefore, it's very important to control size of the Ag particles in the nanoscale and maintain thermal stability thereof.

In processes for producing Ag nanoparticles, organic surfactants or stabilizers are an important operation factor. In addition, most silver slats, for example, silver nitrate, is more easily dissolved in water than organic solutions, and therefore the product is usually prepared in water solution. That is, the existing conditions will restrict applications of the Ag nanoparticles.

The above problems have been discussed in some reports. In J. Phys. Chem. B 1998, 102, 10663-10666, the Ag particles are prepared in water solution and stabilized with molecular chains of sodium polyacrylate or polyacrylamide. In Chem. Mater. 2005, 17, 4630-4635, thioalkylated poly(ethylene glycol) is used as a stabilizer for stabilizing Ag particles in water. In Langmuir 1999, 15, 948-951, 3-aminopropyltrimethoxysilane (APS) is used as a stabilizer and N,N-dimethylformamide is used to reduce silver ions in water. In J. Phys. Chem. B 1999, 103, 9533-9539, sodium citrate is used to prevent the Ag particles from aggregation or agglomeration which results in larger particle size, wider size distribution or multiple-peak distribution. In Langmuir 1996, 12, 3585-3589, some non-ionic surfactants (polyethylene oxide or ethoxylated block) are used to stabilize Ag nanoparticles which are in the form of gel-type particles covered with molecular chains of the surfactant, the examples include poly-(10)-oxyethylene oleyl ether and Tween 80 (polyoxyethylene-(20)-sorbitan monooleate) (available from Sigma). In Langmuir 1997, 13, 1481-1485, $NaBH_4$ is used as a reducing agent, and the reaction equation is:

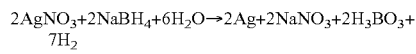

$$2AgNO_3 + 2NaBH_4 + 6H_2O \rightarrow 2Ag + 2NaNO_3 + 2H_3BO_3 + 7H_2$$

In this reaction, the stabilizers are cetyltrimethylammonium bromide (CTAB) as a cationic surfactant, sodium dodecyl sulfate (SDS) as an anionic surfactant and poly(oxyethylene) isooctylphenyl ether-TX-100 as a nonionic surfactant.

As described in the above, the traditional method for stabilizing Ag particles is to add surfactants or stabilizers. However, the solutions of such Ag particles have solid contents less than 10% and can not be in the form of silver slurry, or have a higher solid content with aggregation.

SUMMARY OF THE INVENTION

The object of the present invention is to provide a polymeric polyamine and a method for producing the same, wherein polymeric polyamine can be applied to producing Ag nanoparticles for stabilizing and dispersing.

Another object of the present invention is to provide a method for stabilizing Ag nanoparticles with polymeric polyamine, so that the produced silver slurry, silver gel or solid silver has a high solid content and good stability, even after processing treatment or preservation.

To achieve the above objects, polymeric polyamine of the present invention includes polyoxyalkylene-amine and a linker linking with an amino end thereof. The polyoxyalkylene-amine is preferably monoamine, diamine or triamine having a molecular weight about 200~10,000, and the linker can be anhydride, carboxylic acid, epoxy, isocyanate or poly(styrene-co-maleic anhydride) copolymers (polystyrene-maleic anhydride polymers, SMA).

The proper linker includes: (1) anhydride, for example, maleic anhydride, succinic acid anhydride, trimellitic anhydride (TMA), benzene tetracarboxylic dianhydride (PMDA), phthalic anhydride, tetrahydromethyl-1,3-isobenzofurandione and poly(styrene-co-maleic anhydride) copolymers; (2) carboxylic acid, for example, dicarboxylic acid, adipic acid, succinic acid, p-phthalic, isophthalic acid; (3) glycidyl or epoxide, for example, diglycidyl ether of bisphenol-A (DGEBA), 3,4-epoxycyclohexyl-methyl-3,4-epoxy cyclohexane carboxylate; (4) isocyanate or diisocyanate, for example, toluene diisocyanate, methylen-biphenyldiisocyanate, 1,6-cyclohexamethylene-diisocyanate, methyl isopropyl ketone diisocyanate; and (5) maleic anhydride or maleated polystyrene, for example, SMA. The preferred linker includes benzene tetracarboxylic dianhydride (PMDA), trimellitic anhydride (TMA) and adipic acid.

The polymeric polyamine can have a structural formula: Linker-HN—R—NH-Linker, $H_2N$—R—NH-Linker, $H_2N$—R—NH-Linker, $H_2N$—R—NH-Linker-NH—R—$NH_2$, Linker-(HN—R—NH-Linker)x or $H_2N$—R—NH-(Linker-HN—R—NH)x-H; wherein x=1~5, $H_2N$—R—NH and HN—R—NH are polyoxyalkylene-amine, R can be dianhydride, diacid, epoxy, diisocyanate or poly(styrene-co-maleic anhydride) copolymers (SMA).

The method for producing polymeric polyamine is to react polyoxyalkylene-amine with a linker having a reactive functional group. Segments of polymeric polyamine may chelate silver nanoparticles, and disperse in both water phase and an organic solvent. Accordingly, the Ag nanoparticles can be prepared as a stable concentrated gel, slurry or powders having a concentration more than 10 wt %. The polyoxyalkylene-amine and the linker are defined as the above.

For the process, molar ratio of the polyamine to the linker can be changed to synthesize Linker-(HN—R—NH-Linker)x or $H_2N$—R—NH-(Linker-HN—R—NH)x-H, having different end functional groups.

After reaction of polyoxyalkylene-amine and the linker, the linker provides additional functional groups to enhance stability of silver in water or the organic solvent by chelating with silver. The solution will be more stable and the nanoparticles will not aggregate together.

The molar ratio of the linker to polyoxyalkylene-amine is preferably (n+1): n, n=1~5, the reaction temperature is preferably about 25~150° C., and the reaction time is preferably about 1~12 hours.

In the present invention, the method for stabilizing Ag nanoparticles with polymeric polyamine includes steps of: (a) mixing polymeric polyamine and a water solution of silver salt; (b) reducing the $Ag^+$ ions with a reducer to form a solution of Ag nanoparticles. The polymeric polyamine serves as a stabilizer or a dispersant and comprises polyoxyalkylene-amine and a linker linking with an amino end of polyoxyalkylene-amine.

The polyoxyalkylene-amine has a molecular weight about 200~10,000, and the linker is selected from the group consisting of anhydride, carboxylic acid, glycidyl, epoxide, isocyanate, diisocyanate, maleic anhydride and maleated polystyrene.

The reducer can be $NaBH_4$, methanol, ethanol, glycerin, ethylene glycol, dodecanol, $H_2N-NH_2$, formaldehyde, PVA or DMF. The weight ratio of polymeric polyamine to the silver salt is preferably about 1:10~10:1. The silver salt can be $AgNO_3$, AgI, AgBr, AgCl or silver pentafluoropropionate.

The solution of Ag nanoparticles can be further dewatered to increase solid content thereof. An organic solvent can be also added to transfer the particles into the organic solvent.

The solution of Ag nanoparticles can further comprise sodium hydroxide with a molar ratio to the Ag salt more than 1, so that water solubility of the solution will be increased.

DETAILED DESCRIPTION OF THE PREFERRED EMBODIMENTS

Figure 1:
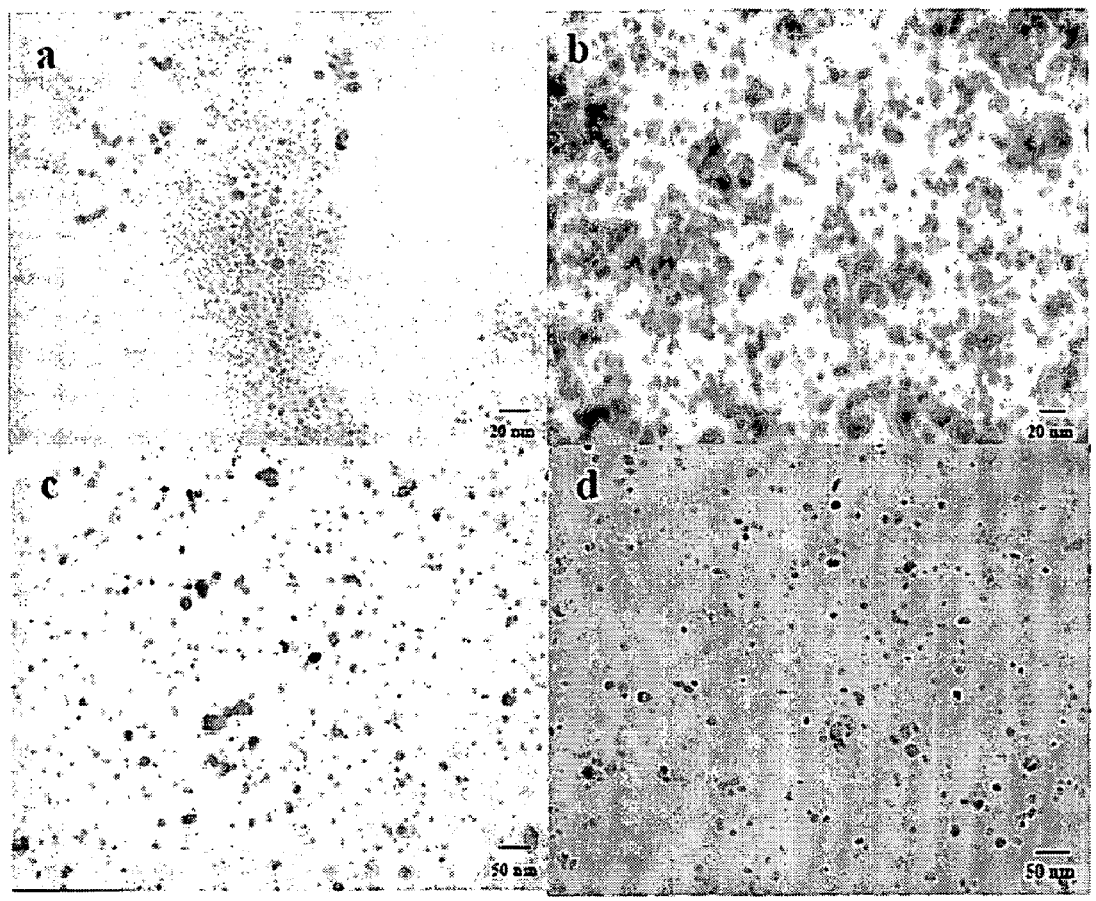
FIG. 1 shows stable distribution of the Ag nanoparticles in the TEM picture.

Materials used in the preferred embodiments of the present invention include:
1. Polyoxyalkylene-amine
    product of Huntsman Chemical Co., Jeffamine® Amines series, including:
    a. Jeffamine ED-2001: poly(oxypropylene-oxyethylene-oxypropylene)-bis-amines, polyoxyalkylene-amine with two functional groups, molecular weight=2000 (a.k.a. POE-2000), white color, hydrophilic, wax-like solid, mp. 35° C., amino content=0.95 mequiv./g, average oxyethylene/oxypropylene unit=39.5/5, structural formula:

$$NH_2CHCH_2\!-\!(\!OCHCH_2\!)_a\!-\!(OCH_2CH_2)_b\!-\!(OCH_2CH)_c\!-\!NH_2$$
with $CH_3$ substituents wherein a+c=6, b=38.7;
    b. Jeffamine M-2070: poly(oxypropylene-oxyethylene)-monoamine, polyoxyalkylene-amine with single functional group, molecular weight=2000 (a.k.a. POP-2000), hydrophobic, structural formula:

$$H_2NCHCH_2\!-\!(OCHCH_2)_a\!-\!(OCH_2CH_2)_b\!-\!OCH_3$$
with $CH_3$ substituents wherein a=10, b=31.
2. Trimellitic anhydride (TMA)
    product of Aldrich Chemical Co., purified with sublimation before using, structural formula:

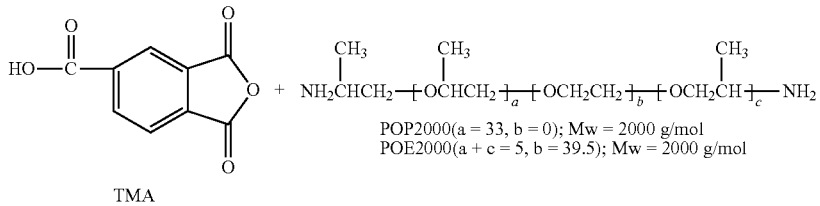

3. Benzene tetracarboxylic dianhydride (PMDA)
    product of Aldrich Chemical Co. or Sino-Japan chemical Co.
4. Poly(styrene-co-maleic anhydride) copolymers (SMA)
    product of Aldrich Chemical Co. or Sino-Japan chemical Co., ratio of styrene/maleic anhydride or maleated polystyrene can be 1/1, 3/1, 6/1 or 11/1, average molecular weight=6,000 (SMA1000), 6,000 (SMA3000), 120,000 (SMA6000) and 140,000 (SMA 11000).
5. 4,4'-methylenebis(phenyl isocyanate) (MDI)
6. Silver nitrate
    $AgNO_3$ (99.8%), product of Aldrich.
7. Tetrahydrofuran (THF)
8. $NaBH_4$
    a reducing agent.
9. NaOH In the present invention, the method for producing polymeric polyamine is to polymerize hydrophilic or hydrophobic polyoxyalkylene-amine with the linker. The product could be hydrophilic or hydrophobic.

The reaction is exemplified with schemes. When the linker is TMA, polyoxyalkylene-amine is hydrophilic POE2000 or hydrophobic POP2000, and sodium hydroxide is added for modifying the ions after the reaction, the reaction equations are as follows:

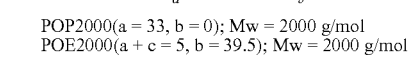

POP2000(a = 33, b = 0); Mw = 2000 g/mol
POE2000(a + c = 5, b = 39.5); Mw = 2000 g/mol

TMA

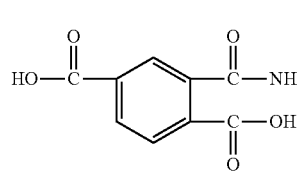
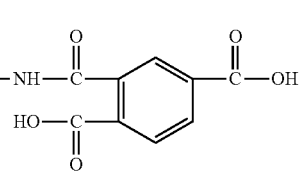
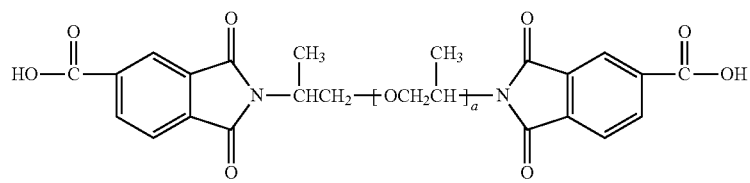
POE2000/4COOH
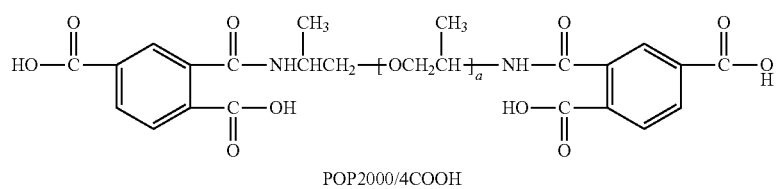
POP2000/2COOH
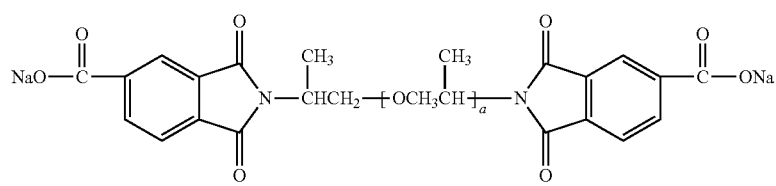
POP2000/4COOH
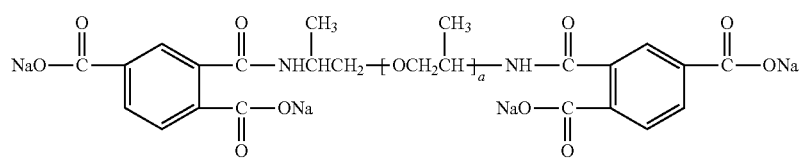
POP2000/2COONa
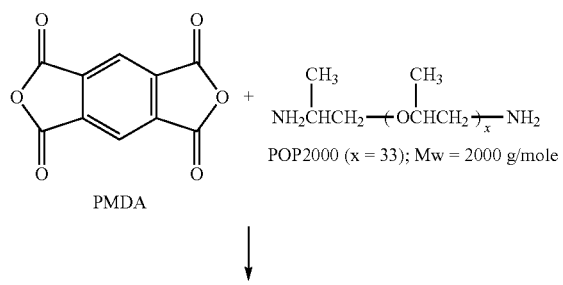
POP2000/4COONa
When the linker is PMDA, polyoxyalkylene-amine is hydrophobic POP2000, and sodium hydroxide is added for modifying the ions after reaction, the reaction equations are as follows:

-continued

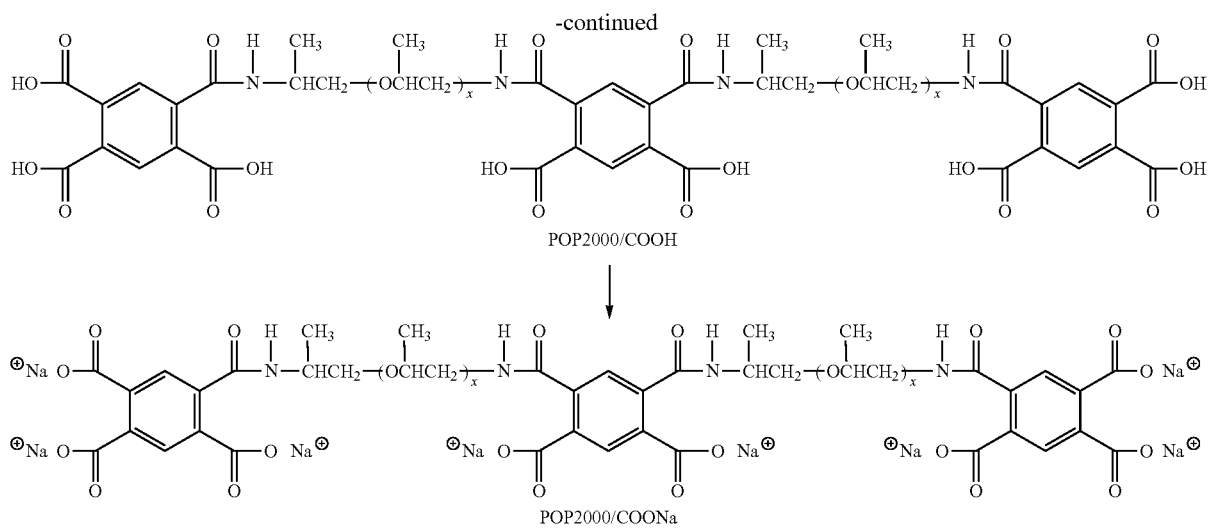

POP2000/COOH

↓

POP2000/COONa

When the linker is SMA and polyoxyalkylene-amine is various, comb-like polymers can be obtained as follows:

SMA

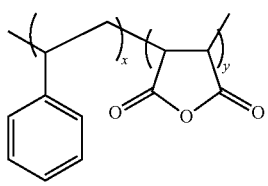

|  | Approx. ratio | Approx. Mw |
|---|---|---|
| SMA1000 | x/y = 1/1 | 6000 |
| SMA3000 | x/y = 3/1 | 6000 |
| SMA6000 | x/y = 6/1 | 12000 |
| SMA11000 | x/y = 11/1 | 12000 |

Comb-Amphilic

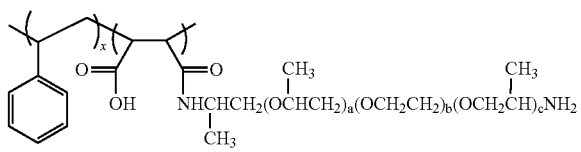

SMA-POA

|  |  |  | Approx. Mw |
|---|---|---|---|
| POP230 | a + c = 2~3 |  | 230 |
| POP400 | a + c = 5~6 |  | 400 |
| POP2000 | a + c = 33 |  | 2000 |
| POP4000 | a + c = 68 | b = 38.7 | 4000 |
| POE2000 | a + c = 6 |  | 2000 |

SMA-M-series

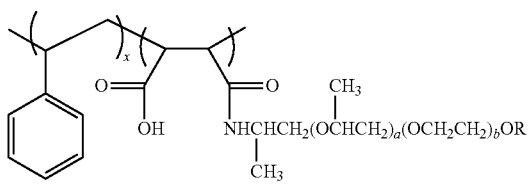

|  |  |  | Approx. Mw |
|---|---|---|---|
| M1000 | a = 3 | b = 9 | 1000 |
| M2070 | a = 10 | b = 32 | 2000 |

When the linker is MDI and polyoxyalkylene-amine is various, the reaction equations are as follows:

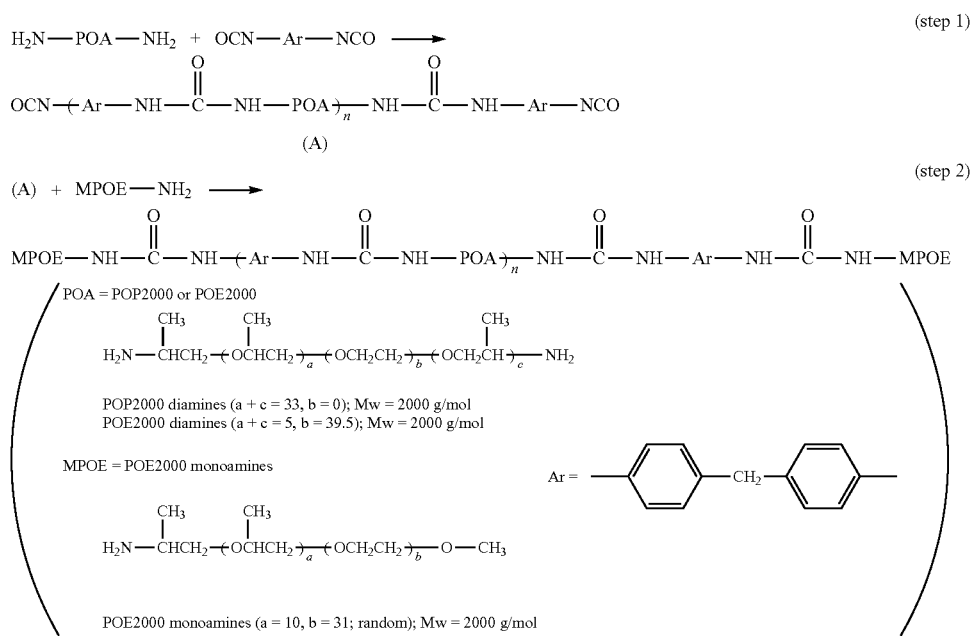

Example 1

Step (A): Preparing a Stabilizer POE2000-TMA/4COOH

First, hydrophilic POE2000 (Jeffamine® ED-2001) is purified with sublimation. THF is dewatered with calcium hydride and then preserved with molecular sieves. Next, to a three-necked bottle (500 ml), POE2000 (100 g, 0.05 mol) is added and dissolved in THF (150 ml), and then anhydride linker TMA (19.2 g, 0.10 mol, previously dissolved in THF (50 ml)) is added drop by drop, so that molar ratio of POE2000 to TMA is 1:2. The reactant is mechanically stirred and filled with nitrogen during the whole reaction. The reaction is performed at 30° C. for 2 hours or longer. FT-IR spectrum is used for monitoring progress of the reaction by sampling every period of time until the anhydride functional groups disappear. After the reaction is completed, THF is removed by decompression to obtain creamy glue product, amido acid POE2000-TMA/4COOH.

Step (B): Synthesizing Ag Nanoparticles (AgNP)

To a three-necked bottle, the stabilizer POE2000/4COOH (0.069 g) is dissolved in water (50 g) which is stirred with a magnetic stirrer. $AgNO_3$ (0.045 g) is then added later. After 2 hours, a $NaBH_4$ solution (0.015 g, previously dissolved in water (50 g)) is added incontinuously and vigorously agitated. The solution immediately becomes black. The reactor is filled with nitrogen during whole reaction.

Example 2

Step (A): Preparing a Stabilizer POE2000-TMA/2COOH

The product POE2000/4COOH of Example 1 is heated at 150° C. for 3 hours. Progress of the reaction is monitored with FT-IR for identifying imido functional groups. The product is imido acid POE2000/2COOH.

Step (B): Synthesizing Ag Nanoparticles (AgNP)

Repeat Step (B) of Example 1, but the stabilizer is replaced with POE2000/2COOH.

Example 3

Step (A): Preparing Stabilizer POP2000-TMA/4COOH

Repeat Step (A) of Example 1, but hydrophilic POE2000 is replaced with hydrophobic POP2000 to obtain product imido acid POP2000/4COOH.

Step (B): Synthesizing Ag Nanoparticles (AgNP)

Repeat Step (B) of Example 1, but the stabilizer is replaced with POE2000/4COOH.

Example 4

Step (A): Preparing Stabilizer POP2000-TMA/2COOH

The product POP2000/4COOH of Example 3 is heated at 150° C. for 3 hours. Progress of the reaction is monitored with FT-IR for identifying imido functional groups. The product is imido acid POP2000/2COOH.

Step (B): Synthesizing Ag Nanoparticles (AgNP)

Repeat Step (B) of Example 1, but the stabilizer is replaced with POP2000/2COOH.

Example 5

Step (A): Preparing Stabilizer POP2000-PMDA/8COONa

To a three-necked bottle (500 ml), POP2000 (40 g, 0.02 mol) is added and dissolved in THF (100 ml), and then the dianhydride linker TMA (6.54 g, 0.03 mol, previously dissolved in THF (100 ml)) is added drop by drop, so that molar ratio of POP2000 to PMDA is 2:3. The reactant is mechanically stirred and filled with nitrogen during the whole reaction. The reaction is performed below 30° C. for 3 hours. FT-IR spectrum is used for monitoring progress of the reaction by sampling every period of time until the anhydride functional groups disappear. After the reaction is completed, THF is removed by decompression to obtain creamy glue product, amido acid POP2000-PMDA/8COOH. Into the product POP2000-PMDA/8COOH (3.2 g, 0.08 mol), NaOH is added to form a water-soluble polymeric sodium compound.

Step (B): Synthesizing Ag Nanoparticles (AgNP)

Repeat Step (B) of Example 1, but the stabilizer is replaced with POP2000-PMDA/8COOH.

Example 6

Step (A): Preparing Stabilizer POE2000-PMDA/4COOH

The product POE2000-PMDA/8COOH of Example 5 is heated at 150° C. for 3 hours. Progress of the reaction is monitored with FT-IR for identifying amido functional groups. The product is amido acid POE2000-PMDA/4COOH.

Step (B): Synthesizing Ag Nanoparticles (AgNP)

Repeat Step (B) of Example 1, but the stabilizer is replaced with POE2000-PMDA/4COOH.

Example 7

Step (A): Preparing Stabilizer POP2000-SMA/COOH

SMA and POP2000 are previously dewatered in vacuum at 120° C. for 6 hours. SMA3000 (10.0 g, 24.4 mmol of MA) and POP2000 (97.6 g, 48.8 mmol) are respectively dissolved in THF (50 mL). Next, SMA is incontinuously added into POP2000. To prevent cross-linking, the molar ratio of POP2000 to SMA is more than 1. Progress of the reaction is monitored with GPC and IR to confirm no cross-linking between the synthesized comb-like polymers. The excess POP2000 is isolated with a solvent mixture of water (or toluene) and ethanol due to different solubilities of the comb-like polymer and the straight-chain polyoxyalkylene-amine. The unreacted POP2000 can be dissolved in the solvent mixture and POP2000-SMA/COOH precipitates.

Step (B): Synthesizing Ag Nanoparticles (AgNP)

Repeat Step (B) of Example 1, but the stabilizer is replaced with POP2000-SMA/COOH.

Example 8

Step (A): Preparing Stabilizer POE2000-POP2000-MDI

Jeffamine® ED-2001 and M2070 are first dewatered in a vacuum oven at 100° C. for 6 hours, and MDI is purified with decompressing distillation. To a three-necked bottle (100 ml), the linker MDI (1.5 g, 6 mmol, previously dissolved in toluene (15 g)) is added, and then ED-2001 (5.99 g, 3 mmol, previously dissolved in toluene (10 g)) is added drop by drop. The solution is continuously mixed with a magnetic stirrer. Next, M2070 (11.99 g, 6 mmol, previously dissolved in toluene (20 g)) is added into the solution. The molar ratio of MDI:ED-2001:M2070 is 2:1:2. The reactor is filled with nitrogen during the whole reaction. Progress of the reaction is monitored with FT-IR until the characteristic functional groups of MDI disappear. The solvent is removed from the solution by heating in a vacuum oven at 80° C. for 12 hours. The product is creamy glue.

Step (B): Synthesizing Ag Nanoparticles (AgNP)

Repeat Step (B) of Example 1, but the stabilizer is replaced with POE2000-POP2000-MDI.

Comparative Example 1

Repeat the procedures of Example 1, but the stabilizer POE2000-TMA/4COOH is replaced with POE2000. After the reaction, a lot of silver particles precipitate on the bottom of the bottle, which shows that the stabilizer synthesized by the method of the present invention is required.

Analysis of the Product

Properties and features of the product of Example 1 are analyzed with instruments and results are as follows:

1. Formation of the Ag Nanoparticles

The Ag nanoparticles are identified by UV absorbance at wave length 400 nm.

2. Stability of the Ag Nanoparticles

FIG. 1 shows TEM pictures of the products concentrated with a rotary evaporator or a drier to have concentrations of 0.01 wt. % (picture a), 0.3 wt. % (picture b), 0.01 wt. % (picture c, diluted from the slurry of 0.3 wt. %), and 0.01 wt. % (picture d, diluted after evaporated). As shown in FIG. 1, the Ag nanoparticles uniformly distribute and have diameters less than 30 nm after heating at 80° C. for 1 hour. That is, the solution containing Ag nanoparticles of the present invention is highly stable.

3. Diameter Distribution

Figure 2:
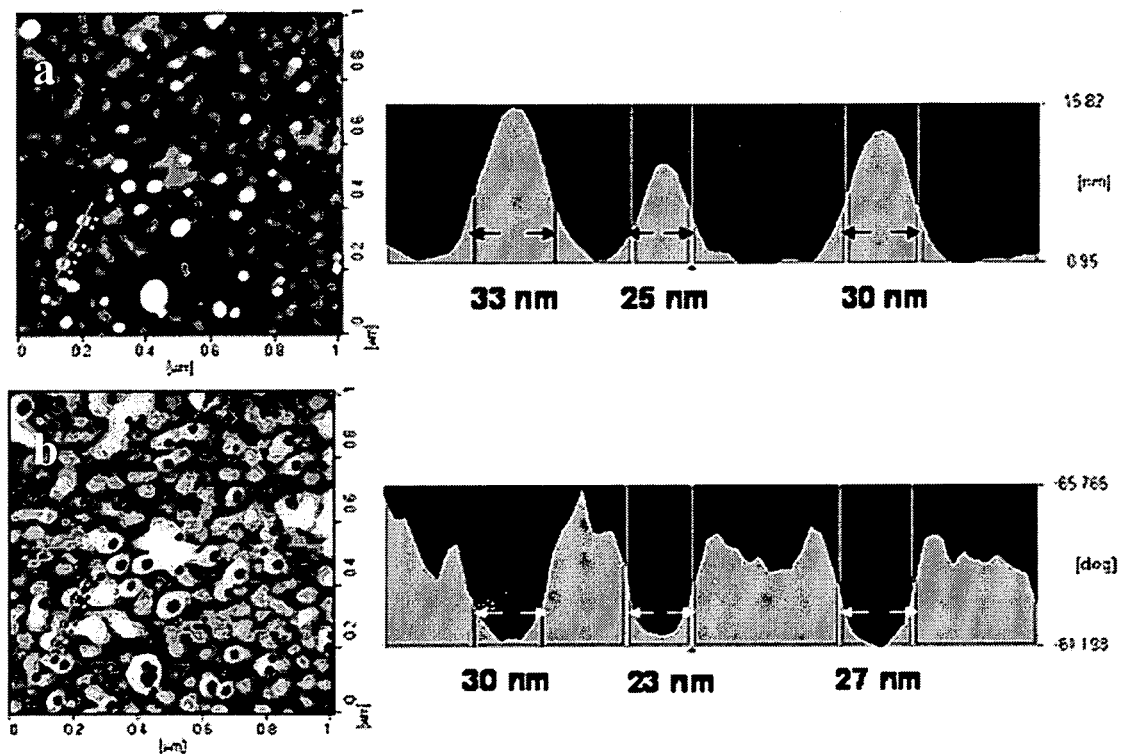
FIG. 2 shows the size distribution of the Ag nanoparticles in the AFM picture.

FIG. 2 shows AFM pictures and distribution of the Ag nanoparticles, in which diameters of the Ag particles range about 33~25 nm.

Concentrating Process

The Ag nanoparticles of the present invention can be concentrated to 10 wt % or higher with an evaporator or a drier, for example, decompression at 80° C. or freezing at 0° C. The highly concentrated solution can be also diluted and the dilution also exhibits good dispersibility and thermal stability.

The traditional silver solution has a concentration limit of 5 wt % and easily forms participate or aggregation. Contractively, by means of the present invention, solid content of the solution containing Ag nanoparticles can be promoted to 10 wt % or even higher. The most important factor is that a novel stabilizer, polymeric polyamine, is provided in the reduction reaction of silver salt into Ag nanoparticles. Molecular weight of the Ag nanoparticles is about 500~10,000 mol/g, and the functional groups may include anhydride, carboxylic acid, epoxy and isocyanate.

According to the above, features or advantages of the present invention at least include:

1. Different sizes of Ag nanoparticles can be obtained by using a synthesized polymeric dispersant and controlling the ratio of polymeric polyamine to silver.

2. The prepared silver dispersion can be concentrated as a silver slurry which can be also diluted as a stable dispersion. The dispersing media can be water or other suitable organic solvents, for example, methanol, ethanol, IPA, acetone, ethylene glycol, dimethylformamide, N,N-dimethylacetamide N-methyl-2-pyrrolidinone, THF, MEK, etc.

3. The Ag nanoparticles of the present invention are both hydrophilic and hydrophobic and thus are compatible with polymer in nanoscale. The highly concentrated solution of Ag nanoparticles can be applied to blending with organic polymer (for example, PI, Epoxy, Nylon, PP, ABS, PS, etc.), so as to improve conductivity, antimicrobial (properties) thereof.

What is claimed is:

1. A high-solid-content solution of Ag nanoparticles, comprising a polymeric polyamine, silver and a solvent, wherein the polymeric polyamine comprises a polyoxyalkylene-amine and a linker linking with an amino end of the polyoxyalkylene-amine, wherein polyoxyalkylene-amine has a molecular weight of 200-10,000 and the linker is selected from the group consisting of anhydride, carboxylic acid, glycidyl, epoxide, isocyanate, diisocyanate, maleic anhydride and maleated polystyrene; wherein the molar ratio of polymeric amine:silver is 1:10~10:1, and the molar ratio of silver:solvent is 1:1000~10:1, and the solid content of silver is 0.01~90 wt. %.

2. The high-solid-content solution of Ag nanoparticles as claimed in claim 1, wherein the solvent is water or an organic solvent.

3. The high-solid-content solution of Ag nanoparticles as claimed in claim 2, wherein the organic solvent is ethanol, acetone, ethylene glycol, dimethylformamide, N,N-dimethylacetamide or N-methyl-2-pyrrolidinone.

4. A method for stabilizing Ag nanoparticles, comprising the steps of:

(a) mixing polymeric polyamine and a water solution of silver salt;

(b) reducing the $Ag^+$ ions with a reducer to form a solution of Ag nanoparticles, wherein the polymeric polyamine serves as a stabilizer or a dispersant and comprises polyoxyalkylene-amine and a linker linking with an amino end of the polyoxyalkylene-amine, and wherein the polyoxyalkylene-amine has a molecular weight of 200~10,000, and the linker is selected from the group consisting of anhydride, carboxylic acid, glycidyl, epoxide, isocyanate, diisocyanate, maleic anhydride and maleated polystyrene.

5. The method as claimed in claim 4, wherein the silver salt is $AgNO_3$, AgI, AgBr, AgCl or silver pentafluoropropionate.

6. The method as claimed in claim 4, wherein the polymeric polyamine and Ag have a weight ratio of 1:10~10:1.

7. The method as claimed in claim 4, wherein the reducer is $NaBH_4$, methanol, ethanol, glycerin, ethylene glycol, dodecanol, $H_2N$—$NH_2$, formaldehyde, PVA or DMF.

8. The method as claimed in claim 4, wherein step (b) is performed at 0~80° C.

9. The method as claimed in claim 4, wherein step (b) is performed for 1~24 hours.

10. The method as claimed in claim 4, wherein the solution of Ag nanoparticles is further dewatered to increase solid content thereof to at least 5 wt %.

11. The method as claimed in claim 4, wherein the solution of Ag nanoparticles is further dewatered by means of freezing or decompression.

12. The method as claimed in claim 4, wherein the solution of Ag nanoparticles is dewatered and an organic solvent is added to move the Ag particles to an organic solvent phase.

13. The method as claimed in claim 12, wherein the organic solvent is ethanol, acetone, ethylene glycol, dimethylformamide, N,N-dimethylacetamide or N-methyl-2-pyrrolidinone.

14. The method as claimed in claim 4, wherein the solution of Ag nanoparticles further comprises sodium hydroxide having a molar ratio of sodium hydroxide:Ag salt of more than 1, such that the water solubility of the solution is increased.

* * * * *